Aug. 30, 1938.   E. A. THOMPSON   2,128,665
POWER TRANSMISSION
Filed June 30, 1936   2 Sheets-Sheet 1

INVENTOR
Edward A. Thompson
BY
Ralph L. Trusdale
ATTORNEY

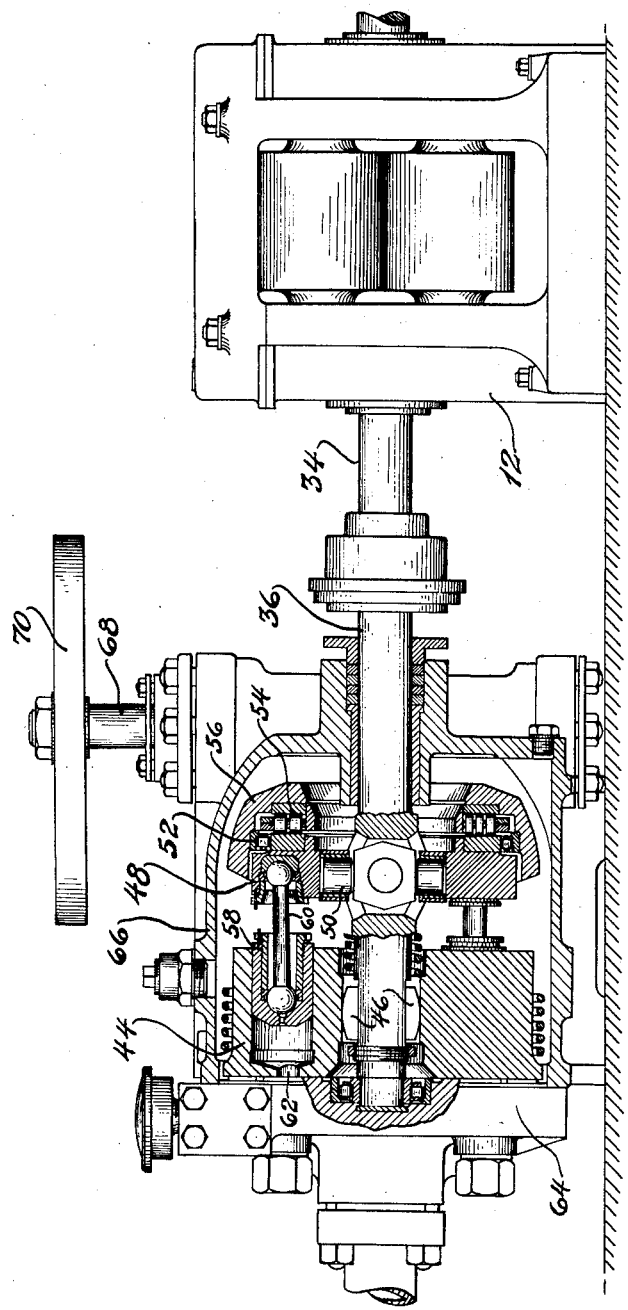

Patented Aug. 30, 1938

2,128,665

UNITED STATES PATENT OFFICE 2,128,665

POWER TRANSMISSION

Edward A. Thompson, Waterbury, Conn., assignor to The Waterbury Tool Company, Waterbury, Conn., a corporation of Connecticut Application June 30, 1936, Serial No. 88,121

13 Claims. (Cl. 80—35)

This invention relates to power transmissions, particularly to transmissions of the fluid type comprising a pair of fluid pressure energy translating devices, one of which may function as a pump and the other as a motor. The invention is particularly adapted for use with sectional machines wherein a strip or web of material passes continuously through the machine, and it is necessary to accurately control the relative speeds between different sections of the machine.

Among the many machines of this general character are rolling mills, paper mills, textile machines, printing presses, wire stranding machines and many others. Machines of this character have been constructed heretofore incorporating a hydraulic transmission for controlling the speed of one or more sections relative to another section of the machine. In such devices as heretofore constructed, however, the hydraulic transmission has been so incorporated in the machine that the full power required to drive a section of the machine has been transmitted through the hydraulic transmission at all times. Thus, one arrangement provides a prime mover, usually an electric motor, for driving one section of the machine with a fixed-ratio, driving connection between the prime mover and that section, together with a second prime mover drivingly connected to a second section of the machine through a variable speed hydraulic transmission. Another arrangement utilizes a single prime mover of sufficient power to drive both sections of the machine with a fixed-ratio connection to one section and a hydraulic transmission driving the second section from the first section. There is but little difference in the relative first cost of either of these two systems especially in the large size machines, since the cost of two small motors is but little, if any, more than a single motor capable of developing an equal amount of power.

In machines where the range of speed variation between two adjacent sections is not large, considerable economy may be effected, according to the present invention, by an arrangement which avoids the necessity of transmitting all of the driving power for one section through the hydraulic transmission without sacrificing in the least any accuracy in achieving and maintaining any desired speed ratio between two sections.

It is an object of the present invention, therefore, to provide a drive for a sectional machine wherein a variable speed transmission of small capacity may be utilized to provide accurate and reliable control of relative speed between sections of the machine.

A further object is to provide a drive for a sectional machine wherein two sections of the machine are driven by independent prime movers and wherein their relative speeds may be controlled and maintained through a hydraulic variable speed transmission interconnecting the two sections.

Further objects and advantages of the present invention will be apparent from the following description, reference being had to the accompanying drawings wherein a preferred form of the present invention is clearly shown.

In the drawings:

Fig. 2 is a cross sectional view on line 2—2 of Fig. 1.

Figure 1:
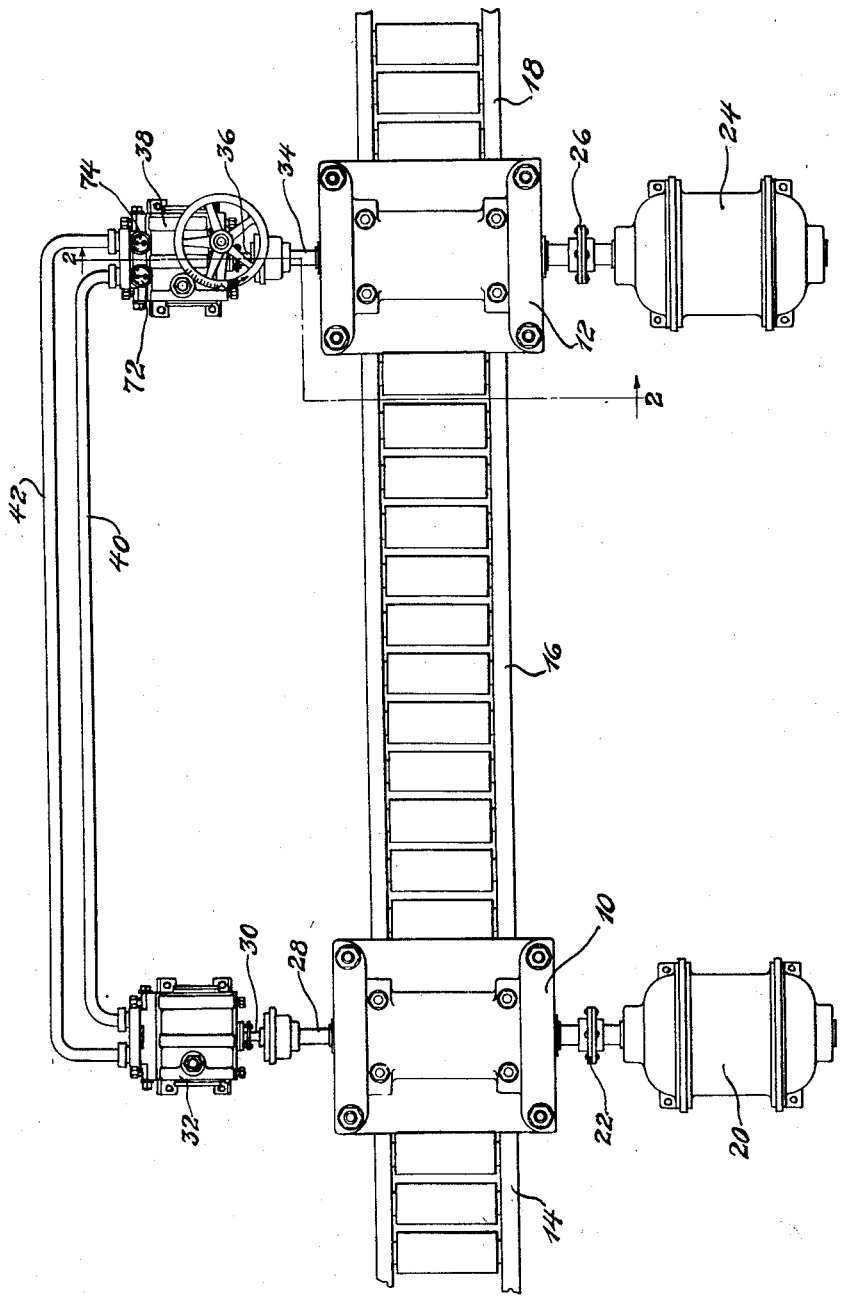
Fig. 1 is a plan view of a rolling mill embodying a preferred form of the present invention.

While the invention may be embodied in any one of various types of machines, the invention is illustrated as applied to a rolling mill. Referring now to Fig. 1 there is illustrated a rolling mill having a first roll stand 10 and a second roll stand 12 with roller tables 14, 16, and 18 for transferring a strip of material from one stand to the next. The stand 10 is driven by a prime mover which may comprise an electric motor 20 in driving relation therewith as by either a direct connection at 22 as illustrated or through suitable reduction gears, if desired. The stand 12 is likewise driven by an electric motor 24 through a connection 26. The stand 10 has a shaft 28 projecting from the opposite side thereof to which is connected a shaft 30 of a fixed displacement fluid pressure energy translating device 32. This device is illustrated as of the well-known "Waterbury" type which is usually operated as a fluid motor and commonly referred to as a "B-end." The stand 12 has a shaft 34 which is connected to a shaft 36 of a second fluid pressure energy translating device 38. The device 38 is of variable displacement and is illustrated as of the well-known "Waterbury" type commonly referred to as an "A-end". The units 32 and 38 are hydraulically connected by means of a pair of fluid conduits 40 and 42.

Referring now to Fig. 2 wherein the internal construction of the unit 38 is illustrated, it will be seen that the shaft 36 is drivingly connected to a cylinder barrel 44 through keys 46 and to a socket ring 48 through a universal joint 50. The socket ring 48 is journalled on radial and thrust bearings 52 and 54 in a tilting box 56 mounted for oscillation on a horizontal trunnion axis passing through the center of the universal joint 50. Pistons 58 are reciprocably mounted in the bores of the cylinder barrel 44 and connected to the socket ring 48 by ball jointed connecting rods 60. The stroke of the pistons and consequently the fluid displacement per revolution is determined by the angular position of the tilting box 56.

The cylinder barrel 44 is provided with ports 62 leading from each of the bores thereof and cooperating with a pair of fixed arcuate ports in a valve plate 64 forming one end of the casing 66 of the device. Each of these arcuate stationary ports is in communication with one of the conduits 40 and 42. A control shaft 68 projecting from the top of the casing carries a hand wheel 70 and is connected by mechanism, not shown, to the tilting box 56 whereby rotation of the hand wheel 70 causes adjustment of the tilting box 56 about its trunnion axis.

Suitable replenishing and relief valves and provision for expansion and contraction of the power transmission fluid such as lubricating oil, which are well known in the art and have not been illustrated, are made. Pressure gauges 72 and 74 are mounted on the valve plate 64 to indicate the pressure in the conduits 40 and 42 respectively. The internal construction of the unit 32 is similar to that of the unit 38 except that a fixed angle box is provided in place of the tilting box 56 and its associated control mechanism.

In operation the transmission having been filled with power transmission fluid, the motors 20 and 24 are started causing the roll stands 10 and 12 to operate, feeding strip material from one stand to the other. The shafts 30 and 36 of the units 32 and 38 are thereby caused to rotate and fluid is circulated between the two units through the conduits 40 and 42. If the angle of the tilting box 56 be adjusted to the maximum value, assuming equal displacements in the units 32 and 38 and equal driving ratios between the peripheral speeds of their respective rolls and driving shafts, it will be seen that the two roll stands 10 and 12 will be maintained at a one to one speed ratio, since the quantity of fluid passing through the unit 32 is necessarily equal to the quantity passing through the unit 38.

If it is desired to alter the relative speeds between the roll stands 10 and 12, the tilting box 56 may be adjusted in the proper direction by the hand wheel 70 to alter the displacement of the unit 38. Thus, if it be assumed that the roll stands 10 and 12 are being operated in a direction to feed material from the stand 10 to the stand 12 and if it is desired to increase the speed of the stand 12 over that of the stand 10, the displacement of the unit 38 will be decreased. Assuming the fluid to circulate from the unit 32 through the pipe 40 to the unit 38 and to return through the pipe 42 to the unit 32, it will be seen that for the unit 38 to handle the same quantity of fluid which the unit 32 handles, it must rotate at a speed relative to the speed of unit 32 which is inversely proportional to the displacement of the unit 38 relative to that of the unit 32. The hydraulic transmission thereby acts as a booster for the stand 12 to increase its speed over that at which it would normally be driven by the motor 24.

In installations where it may be necessary to have a range of speed variation on the stand 12 both above and below the speed of the stand 10, the displacement of the unit 38 at full stroke may be made somewhat larger than that of the unit 32, or alternatively, the two units may be of equal displacement and the ratio between the shaft speed of the unit 38 and the peripheral speed of the rolls in the stud 12 may be such as to produce a higher roll speed at the stand 12 than at the stand 10 for the same shaft speed at the two units 32 and 38. Thus, when the displacement of the unit 38 is decreased below that required for one to one ratio between the two stands the drive functions to speed up the roll stand 12 relative to that of the stand 10. If the displacement of the unit 38 be increased beyond that necessary for one to one ratio the speed of the roll stand 12 will be decreased below that of stand 10. In the former case the unit 32 acts as a pump and the unit 38 as a motor while in the latter case the actions are transposed.

It will be understood that the invention is not limited to a drive for but two sections of a machine but that three or more sections may be driven in an analogous manner by providing a variable displacement fluid pressure energy translating device at each section beyond the first and connecting all the devices in a series circuit, and that the relative speeds of the various sections may be adjusted by corresponding adjustment of the displacement of the hydraulic unit associated therewith.

While the form of embodiment of the invention as herein disclosed, constitutes a preferred form, it is to be understood that other forms might be adopted, all coming within the scope of the claims which follow.

What is claimed is as follows:

1. In a sectional machine for operating on a continuous strip of material, a drive therefor comprising in combination a first prime mover drivingly connected to one section of the machine, a second prime mover drivingly connected to a second section of the machine, a hydraulic transmission comprising a pair of fluid pressure energy translating devices each of which may function as a pump or as a motor, each device being operatively connected to one of said sections, and fluid conduits connecting said devices, said transmission acting to control the relative speed of said sections solely through its driving connections thereto.

2. In a sectional machine for operating on a continuous strip of material, a drive therefor comprising in combination a first prime mover drivingly connected to one section of the machine, a second prime mover drivingly connected to a second section of the machine, a hydraulic transmission comprising a pair of fluid pressure energy translating devices each of which may function as a pump or as a motor, and one of which is adjustable as to fluid displacement, each device being operatively connected to one of said sections, and fluid conduits connecting said devices, said transmission acting to control the relative speed of said sections solely through its driving connections thereto.

3. In a sectional machine for operating on a continuous strip of material, a drive therefor comprising in combination a first prime mover drivingly connected to one section of the machine, a second prime mover drivingly connected to a second section of the machine, a hydraulic transmission comprising a pair of fluid pressure energy translating devices each of which may function as a pump or as a motor, each device being operatively connected to one of said sections, fluid conduits connecting said devices, and means for varying the relative displacements of said devices whereby the relative speed of said sections may be varied, said transmission acting to control the relative speed of said sections solely through its driving connections thereto.

4. In a sectional machine for operating on a continuous strip of material, a drive therefor comprising in combination a first prime mover drivingly connected to one section of the machine, a second prime mover drivingly connected to a second section of the machine, and a positively operating variable speed transmission connected directly between said sections and forming an unyielding connection whereby their relative speeds may be controlled independently of the normal speed at which the prime movers tend to drive each section, said transmission acting to control the relative speed of said sections solely through its driving connections thereto.

5. In a sectional machine for operating on a continuous strip of material, a drive therefor comprising in combination a first prime mover drivingly connected to one section of the machine, a second prime mover drivingly connected to a second section of the machine, and a hydraulic variable speed transmission interconnecting said sections whereby their relative speeds may be controlled independently of the normal speed at which the prime movers tend to drive each section, said transmission acting to control the relative speed of said sections solely through its driving connections thereto.

6. In a sectional machine for operating on a continuous strip of material, a drive therefor comprising in combination a first prime mover drivingly connected to one section of the machine, a second prime mover drivingly connected to a second section of the machine, a hydraulic transmission comprising a pair of fluid pressure energy translating devices each of which may function as a pump or as a motor, and one of which is adjustable as to fluid displacement, each device being operatively connected to one of said sections, a pair of fluid conduits connecting said devices, said transmission acting to control the relative speed of said sections solely through its driving connections thereto, and means for indicating the power transmitted from one section to the other through said transmission.

7. In a sectional machine for operating on a continuous strip of material, a drive therefor comprising in combination a first prime mover drivingly connected to one section of the machine, a second prime mover drivingly connected to a second section of the machine, a hydraulic transmission comprising a pair of fluid pressure energy translating devices each of which may function as a pump or as a motor, and one of which is adjustable as to fluid displacement, each device being operatively connected to one of said sections, a pair of fluid conduits connecting said devices, said transmission acting to control the relative speed of said sections solely through its driving connections thereto, and a pressure gauge for indicating the fluid pressure in each conduit.

8. In a sectional machine for operating on a continuous strip of material, a drive therefor comprising in combination a first prime mover drivingly connected to one section of the machine, a second prime mover drivingly connected to a second section of the machine, a hydraulic transmission comprising a pair of fluid pressure energy translating devices each of which may function as a pump or as a motor, means mechanically connecting one of said devices to one section of the machine for rotation therewith in fixed speed relation, means connecting the other device with the other section of the machine for rotation therewith in fixed speed relation, and a pair of fluid conduits connecting said devices, said transmission acting to control the relative speed of said sections solely through its driving connections thereto.

9. In a sectional machine for operating on a continuous strip of material, a drive therefor comprising in combination a first prime mover drivingly connected to one section of the machine, a second prime mover drivingly connected to a second section of the machine, a hydraulic transmission comprising a pair of fluid pressure energy translating devices each of which may function as a pump or as a motor, means mechanically connecting one of said devices to one section of the machine for rotation therewith in fixed speed relation, means connecting the other device with the other section of the machine for rotation therewith in fixed speed relation, a pair of fluid conduits connecting said devices, and means for varying the relative displacements of said devices whereby the relative speeds of said sections may be varied, said transmission acting to control the relative speed of said sections solely through its driving connections thereto.

10. In a sectional machine, a drive therefor comprising in combination a plurality of individual prime movers each drivingly connected to one section of the machine at a fixed speed ratio, a plurality of fluid pressure energy translating devices each connected to one section of the machine at a fixed speed ratio and fluid conduits connecting said devices in a series circuit, said transmission acting to control the relative speed of said sections solely through its driving connections thereto.

11. In a sectional machine, a drive therefor comprising in combination a plurality of individual prime movers each drivingly connected to one section of the machine at a fixed speed ratio, a plurality of fluid pressure energy translating devices each connected to one section of the machine at a fixed speed ratio, fluid conduits connecting said devices in a series circuit, and means for varying the displacement of at least one of the units, said transmission acting to control the relative speed of said sections solely through its driving connections thereto.

12. In a sectional machine for operating on a continuous strip of material, a drive therefor comprising in combination a first prime mover drivingly connected to one section of the machine, a second prime mover drivingly connected to a second section of the machine, a hydraulic transmission comprising a pair of fluid pressure energy translating devices each of which may function as a pump or as a motor, one of which is manually adjustable as to fluid displacement, means mechanically connecting one of said devices to one section of the machine and the prime mover therewith for rotation in fixed speed relation, means mechanically connecting the other device with the other section of the machine and the prime mover therewith for rotation in fixed speed relation, and a pair of fluid conduits connecting said devices, said transmission acting to control the relative speed of said sections solely through its driving connections thereto.

13. In a sectional machine for operating on a continuous strip of material the combination of two roll stands, a first electric motor drivingly connected to one roll stand, a second electric motor drivingly connected to the other roll stand, a hydraulic transmission comprising a pair of fluid pressure energy translating devices each of which may function as a pump or a motor, one of said devices being manually adjustable as to fluid displacement for varying the relative speeds of the stands, a pair of fluid conduits connecting said devices, means mechanically connecting one of the said devices to one of the roll stands and the electric motor therewith for rotation in fixed speed relation, and means mechanically connecting the other device with the other roll stand and the electric motor therewith for rotation in fixed speed relation, said transmission acting to control the relative speed of said roll stands solely through its driving connections thereto.

EDWARD A. THOMPSON.